United States Patent [19]

Colchester

[11] 3,716,546

[45] Feb. 13, 1973

[54] PRODUCTION OF BIPYRIDYLIUM SALTS AND RELATED COMPOUNDS

[75] Inventor: John Edward Colchester, Runcorn, England

[73] Assignee: Imperial Chemical Industries Limited, London, England

[22] Filed: March 1, 1971

[21] Appl. No.: 119,893

Related U.S. Application Data

[63] Continuation of Ser. No. 811,249, March 27, 1969, abandoned.

[52] U.S. Cl. ........................260/295 AM, 260/296 D
[51] Int. Cl. .........................C07d 31/42, C07d 31/44

[58] Field of Search ....................260/296 D, 295 AM

[56] References Cited

UNITED STATES PATENTS 3,642,790  2/1972  Cairns..........................260/296 D X Primary Examiner—Alan L. Rotman
Attorney—Cushman, Darby & Cushman

[57] ABSTRACT

A process for the production of 1,1'-disubstituted-4,4'-bipyridylium salts which comprises reacting the corresponding 1,1'-disubstituted-1,1',4,4'-tetrahydro-4,4'-bipyridyl with a free radical compound.

4 Claims, No Drawings

PRODUCTION OF BIPYRIDYLIUM SALTS AND RELATED COMPOUNDS

This application is a streamlined continuation application of my copending application Ser. No. 811,249, filed on Mar. 27, 1969, now abandoned.

This invention relates to the production of bipyridylium salts and related compounds, particularly 1,1'-disubstituted-4,4'-bipyridylium salts which are useful herbicides.

In U.K. Pat. Specification No. 1,073,081 there are described and claimed processes whereby N,N'-disubstituted tetrahydro-4,4'-bipyridyls may be oxidized to N,N'-disubstituted-4,4'-bipyridylium salts using organic oxidants, especially quinones. In U.K. Pat. Specification No. 1,077,366 there is described and claimed a process for converting N,N'-disubstituted tetrahydro-4,4'-bipyridyls to N,N'-disubstituted-4,4'-bipyridylium salts by treatment with one or more carbon compounds each of which contains a labile halogen atom.

We have now found that N,N'-(or 1,1'-)disubstituted-1,1',4,4'-tetrahydro-4,4'-bipyridyls can be converted in good yields into N,N'-(or 1,1'-)disubstituted-4,4'-bipyridylium salts by reacting them with free radical compounds.

Thus according to the present invention we provide a process for the production of 1,1'-disubstituted-4,4'-bipyridylium salts which comprises reacting the corresponding 1,1'-disubstituted-1,1',4,4'-tetrahydro-4,4'-bipridyl with a free radical compound.

Tetrahydrobipyridyls which may conveniently be used in the process include those more fully described in U.K. Pat. Specification No. 1,073,081, for example tetrahydro-bipyridyls which carry alkyl or carbamidoalkyl, and particularly methyl or N,N-disubstituted carbamidomethyl substituents on the nitrogen atoms. Other suitable 1,1'-disubstituted-1,1',4,4'-tetrahydro-4,4'-bipyridyls are those carrying inert substituents, for example alkyl groups, on the carbon atoms of the pyridine nuclei.

Any organic or inorganic compound may be employed which comprises or can be caused to liberate a stable free radical under the conditions of the reaction. An example of a suitable organic free radical compound is 2,2'-diphenyl-1-picrylhydrazide and an example of a suitable inorganic free radical compound is $NO(SO_3K)_2$ which is commonly known as "Fremy's" salt.

The tetrahydrobipyridyl and the free radical compound can be interacted simply by mixing them but we prefer to carry out the reaction in solution in an inert solvent for the tetrahydrobipyridyl. The solvent preferably also dissolves the free radical compound. Examples of suitable solvents are ethers for example diethyl ether, tetrahydrofuran, 1,2-dimethyoxyethane, bis-(2-methoxyethyl)ether and 1,4-dioxane; ketones, for example acetone; hydrocarbons, for example benzene and hexane; organic bases, for example pyridine; halogenated hydrocarbons and particularly chlorinated hydrocarbons, for example chlorobenzene, chloroform and methylene dichloride; amides, particularly tertiary alkyl-amides, for example formamide; sulphoxides, for example dimethyl sulphoxide; and nitriles, for example acetonitrile. Mixtures of solvents may be used.

We prefer to react about, or rather more than, 2 moles of the free radical compound per mole of the tetrahydrobipyridyl. A smaller proportion than this of the free radical compound will tend to leave some of the tetrahydrobipyridyl unreacted.

The temperature at which the reaction is carried out depends upon the concentration of the reagents and on the particular reagents and solvent (if present) used. We have found that suitable temperatures are from about −40° C to 150° C, preferably from 0° C to 120° C and especially from about 25°C to 80°C; temperatures above 150°C tend to cause decomposition of the tetrahydrobipyridyl and at temperatures below 0°C the rate of reaction is very slow. The most suitable time of reaction can be found by simple experiment.

The 1,1'-disubstituted-4,4'-bipyridylium salt may be recovered from the reaction mixture by conventional processes for example by extratraction of the reaction mixture with water or with a dilute aqueous solution of a mineral acid such as sulphuric, hydrochloric and phosphoric or acetic acid. The 1,1'-bipyridylium salt may then be recovered from the aqueous phase, after separation from the organic phase, by evaporation of the water and crystallization of the salt.

The invention is illustrated but in no way limited by the following Examples.

EXAMPLE 1

A solution of N,N'-dimethyl-1,1',4,4'-tetrahydro-4,4'-bipyridyl (1.88 g) in diethyl ether (24 mls) was added dropwise over a period of 10 minutes to a solution of "Fremy's" salt (5.4 g) in formamide (150 mls) maintained under an atmosphere of nitrogen. The mixture was maintained at 40°C under nitrogen for 3 hours and after this period dilute (N/10) hydrochloric acid (200 mls) was added and air was blown through the mixture. The solution was then analyzed colorimetrically and the analysis indicated the presence of N,N'-dimethyl-4,4'-bipyridylium chloride in an amount representing a reaction efficiency of 30 percent based on the 1,1'-dimethyl-1,1',4,4'-tetrahydro-4,4'-bipyridyl starting material fed.

EXAMPLE 2

2,2'-diphenyl-1-picrylhydrazide (2.5 g) was dissolved in tetrahydrofuran (50 mls) at 40°C and an atmosphere of nitrogen was created above the solution. 1,1'-dimethyl-4,4'-tetrahydrobipyridyl (0.5 g) in diethyl ether (7 mls) was added dropwise over a period of 10 minutes. The resulting mixture was stirred for about 30 minutes after which time N-hydrochloric acid (100 mls) was added and air was blown through the mixture. Phase separation occurred and the aqueous phase was analyzed colorimetrically for 1,1'-dimethyl-4,4'-bipyridyl dichloride. The analysis indicated a reaction efficiency of 14 percent based on the tetrahydrobipyridyl starting material.

The above procedure was repeated twice but using benzene at 40°C and formamide at ambient temperature respectively as the reaction medium instead of tetrahydrofuran at 40°C. with benzene at 40°C as solvent, the reaction efficiency was 5 percent and with formamide at ambient temperature the reaction efficiency was 14.5 percent.

I claim:

1. A process for the production of 1,1'-disubstituted-4,4'-bipyridylium salts wherein the 1,1'-substituents are lower alkyl or carbamidomethyl of formula -$R_1$-$CONR_2R_3$ wherein $R_1$ is methylene and $R_2$ and $R_3$ are lower alkyl, which comprises reacting by mixing together at −40°C. to 150°C. a solution of the corresponding 1,1'-disubstituted-1,1'-4,4'-tetrahydro-4,4'-bipyridyl and a solution of a free radical which is a hydrogen acceptor and which is stable under the reaction conditions and which is selected from the group consisting of 2,2'-diphenyl-1-picryl-hydrazide and $NO(SO_3K)_2$, said tetrahydro-4,4'-bipyridyl and free radical both being dissolved in an inert organic solvent therefor, acidifying the resulting reaction mixture with a mineral acid or acetic acid and recovering the 1,1-disubstituted-4,4'-bipyridylium salt from the reaction mixture.

2. A process as claimed in claim 1 wherein the temperature is from 0°C. to 120°C.

3. A process as claimed in claim 2 wherein the temperature is from 25°C. to 80°C.

4. A process as claimed in claim 1 in which at least 2 moles of the free radical are provided for each mole of the tetrahydrobipyridyl.

* * * * *